US012003587B2

(12) United States Patent
Du et al.

(10) Patent No.: US 12,003,587 B2
(45) Date of Patent: Jun. 4, 2024

(54) METHOD AND SYSTEM FOR TRANSMITTING DATA, GATEWAY DEVICE, AND OPERATING TERMINAL DEVICE

(71) Applicant: BOE Technology Group Co., Ltd., Beijing (CN)

(72) Inventors: Hongjun Du, Beijing (CN); Yi Bian, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/501,863

(22) Filed: Oct. 14, 2021

(65) Prior Publication Data

US 2022/0131942 A1 Apr. 28, 2022

(30) Foreign Application Priority Data

Oct. 26, 2020 (CN) .......................... 202011159237.6

(51) Int. Cl.
*H04L 67/141* (2022.01)
*H04L 67/12* (2022.01)
(Continued)

(52) U.S. Cl.
CPC ............ *H04L 67/141* (2013.01); *H04L 67/12* (2013.01); *H04L 67/303* (2013.01); *G16Y 30/00* (2020.01)

(58) Field of Classification Search
CPC ....... H04L 67/141; H04L 67/303; G06F 3/14; G06F 9/451; G06F 40/106; G06F 16/9577; G09G 3/2096
See application file for complete search history.

(56) References Cited

U.S. PATENT DOCUMENTS 8,131,865 B2 * 3/2012 Rebaud .................. G06F 21/60
725/28
9,829,947 B1 * 11/2017 Nagarajan ................ G06F 1/28
(Continued)

FOREIGN PATENT DOCUMENTS

| CN | 103873284 A | 6/2014 |
| CN | 109541950 A | 3/2019 |
| CN | 110659006 A | 1/2020 |

OTHER PUBLICATIONS

CN202011159237.6 first office action.

*Primary Examiner* — Tonia L Dollinger
*Assistant Examiner* — Linh T. Nguyen
(74) *Attorney, Agent, or Firm* — IPro, PLLC

(57) ABSTRACT

A method for transmitting data is provided. The method includes: receiving identification information sent by at least one display terminal device; establishing a communication connection with an operating terminal device, and acquiring display content information of the at least one display terminal device from the operating terminal device, the display content information being generated based on target display content of the at least one display terminal device, and the target display content of the at least one display terminal device being determined by the operating terminal device; and sending the display content information to the at least one display terminal device based on the identification information of the at least one display terminal device, such that the at least one display terminal device performs display based on the display content information.

10 Claims, 3 Drawing Sheets

(51) Int. Cl.
  *H04L 67/303* (2022.01)
  *G16Y 30/00* (2020.01)

(56) References Cited

U.S. PATENT DOCUMENTS

| | | | |
|---|---|---|---|
| 9,881,058 B1* | 1/2018 | Liu | G06F 16/24578 |
| 10,021,049 B2* | 7/2018 | Hwang | H04L 67/06 |
| 10,044,728 B1* | 8/2018 | Tripathi | H04L 67/02 |
| 10,498,801 B2* | 12/2019 | Yuan | H04L 65/1094 |
| 2006/0271499 A1* | 11/2006 | Course | G06Q 20/3674 |
| | | | 705/67 |
| 2009/0300108 A1* | 12/2009 | Kohno | H04L 67/303 |
| | | | 709/224 |
| 2011/0047080 A1* | 2/2011 | Im | G06F 21/10 |
| | | | 705/1.1 |
| 2015/0088621 A1* | 3/2015 | Shinohara | G06Q 30/0241 |
| | | | 705/14.4 |
| 2015/0288779 A1* | 10/2015 | Okumura | H04W 4/80 |
| | | | 709/219 |
| 2016/0048640 A1* | 2/2016 | Chung | G16Z 99/00 |
| | | | 705/3 |
| 2016/0212194 A1* | 7/2016 | Palin | H04W 4/80 |
| 2017/0229092 A1* | 8/2017 | Itoh | G06F 3/1423 |
| 2017/0316760 A1* | 11/2017 | Wang | G06F 1/163 |
| 2017/0324988 A1* | 11/2017 | Fan | H04N 21/431 |
| 2018/0131985 A1* | 5/2018 | Vijayan | H04N 21/4312 |
| 2018/0276716 A1* | 9/2018 | Mino | G06Q 30/0272 |
| 2018/0310149 A1 | 10/2018 | Lee et al. | |
| 2019/0108200 A1* | 4/2019 | Nambannor Kunnath | |
| | | | G09G 5/30 |
| 2020/0076763 A1* | 3/2020 | Elsloo | H04L 67/52 |
| 2020/0272876 A1* | 8/2020 | Feng | G06Q 10/1091 |
| 2021/0099833 A1* | 4/2021 | Cheng | H04L 67/52 |
| 2021/0110105 A1* | 4/2021 | Smajic | H04L 51/18 |
| 2021/0397763 A1* | 12/2021 | Gupta | G06F 30/18 |
| 2022/0103438 A1* | 3/2022 | Kerzner | G06F 16/9535 |
| 2022/0131942 A1* | 4/2022 | Du | H04L 67/303 |
| 2022/0215316 A1* | 7/2022 | Nelson | G06Q 10/06393 |
| 2022/0238061 A1* | 7/2022 | McDaniel | G09G 3/2092 |
| 2023/0107617 A1* | 4/2023 | Li | G06F 3/0482 |
| | | | 715/728 |

* cited by examiner

METHOD AND SYSTEM FOR TRANSMITTING DATA, GATEWAY DEVICE, AND OPERATING TERMINAL DEVICE

CROSS REFERENCE TO RELATED APPLICATION

This application claims priority to Chinese patent application No. 202011159237.6, filed on Oct. 26, 2020 and entitled "METHOD AND SYSTEM FOR TRANSMITTING DATA, GATEWAY DEVICE, AND OPERATING TERMINAL DEVICE", the disclosure of which is incorporated in the present disclosure by reference in its entirety.

TECHNICAL FIELD

The present disclosure relates to the field of Internet of Things technologies, and more particularly, to a method and system for transmitting data, a gateway device, and an operating terminal device.

BACKGROUND

At present, it is generally necessary to provide table cards in a conference room to show identities of participants. Traditional table cards are usually made of paper or copper, and name tags need to be changed every time such table cards are used.

With the development of technologies, some electronic display table cards, such as electrophoretic display (EPD) table cards, are also available on the market.

SUMMARY

The present disclosure provides a method and system for transmitting data, a gateway device, and an operating terminal device. The technical solutions are as follows.

In a first aspect of the present disclosure, a method for transmitting data is provided. The method is applicable to a gateway device and includes: receiving identification information sent by at least one display terminal device; establishing a communication connection with an operating terminal device, and acquiring display content information of the at least one display terminal device from the operating terminal device, the display content information being generated based on target display content of the at least one display terminal device, and the target display content of the at least one display terminal device being determined by the operating terminal device; and sending the display content information to the at least one display terminal device based on the identification information of the at least one display terminal device, such that the at least one display terminal device performs display based on the display content information.

Optionally, the display content information is generated based on an operation instruction of the operating terminal device, the operation instruction being generated based on the target display content of the at least one display terminal device determined on an operation interface, the operation interface being generated based on the identification information of the at least one display terminal device.

Optionally, the display content information is related to the identification information of the display terminal device, and sending the display content information to the at least one display terminal device based on the identification information of the at least one display terminal device includes: sending the display content information to the display terminal device corresponding to the related identification information of the display terminal device.

Optionally, the method further includes: sending one of an operation interface and the identification information of the display terminal device to the operating terminal device, wherein the operation interface is generated based on the identification information of the display terminal device, and configured to display to-be-determined target display content of the display terminal device corresponding to the identification information of the display terminal device; and the identification information of the display terminal device is configured to enable the operating terminal device to generate the operation interface based on the identification information of the display terminal device.

Optionally, acquiring the display content information of the at least one display terminal device includes: sending the operation interface to the operating terminal device, such that the operating terminal device determines target display content corresponding to the to-be-determined target display content and generates an operation instruction for the target display content based on the target display content; and receiving the operation instruction sent by the operating terminal device, and generating the display content information based on the operation instruction.

Optionally, establishing the communication connection with the operating terminal device includes: acquiring gateway device information and issuing the gateway device information to a local area network, such that the operating terminal device connected to the local area network acquires the gateway device information and establishes the communication connection with the gateway device based on the gateway device information.

Optionally, the gateway device information includes an IP address of the gateway device, a network service port and a version number.

In a second aspect of the present disclosure, a method for transmitting data is provided. The method is applicable to an operating terminal device and includes: establishing a communication connection with a gateway device, and determining target display content of at least one display terminal device; and sending display content information of the at least one display terminal device by the gateway device to the at least one display terminal device, the display content information being generated based on the target display content of the at least one display terminal device.

Optionally, determining the target display content of the at least one display terminal device includes: providing an operation interface, the operation interface being generated based on identification information of the at least one display terminal device and configured to display to-be-determined target display content of the display terminal device corresponding to the identification information of the display terminal device; and determining the target display content from the to-be-determined target display content through the operation interface.

Optionally, providing the operation interface includes: providing the operation interface in one of the following ways: receiving the operation interface sent by the gateway device, the operation interface being generated by the gateway device based on the identification information of the display terminal device; and receiving the identification information of the display terminal device sent by the gateway device, and generating the operation interface based on the identification information of the display terminal device.

Optionally, sending the display content information of the at least one display terminal device by the gateway device to the at least one display terminal device includes: generating an operation instruction configured to determine the target display content of the at least one display terminal device, based on the target display content of the at least one display terminal device; and sending the operation instruction to the gateway device, such that the gateway device sends the display content information to the at least one display terminal device based on the operation instruction.

Optionally, sending the display content information of the at least one display terminal device by the gateway device to the at least one display terminal device includes: generating the display content information based on the target display content of the at least one display terminal device; and sending the display content information to the gateway device.

Optionally, establishing the communication connection with the gateway device includes: acquiring gateway device information in a local area network, and establishing the communication connection with the gateway device based on the gateway device information.

Optionally, the gateway device information includes an IP address of the gateway device, a network service port and a version number.

In a third aspect of the present disclosure, a gateway device is provided. The gateway device includes a memory, a processor, and a computer program that is stored in the memory and operable on the processor, wherein the processor, when executing the computer program, is caused to implement any of the methods for transmitting data in the first aspect.

In a fourth aspect of the present disclosure, an operating terminal device is provided. The operating terminal device includes a memory, a processor, and a computer program that is stored in the memory and operable on the processor, wherein the processor, when executing the program, is caused to implement any of the methods for transmitting data in the second aspect.

In a fifth aspect of the present disclosure, a system for transmitting data is provided. The system includes a display terminal device, any of the gateway devices described in the third aspect, and any of the operating terminal devices described in the fourth aspect.

DETAILED DESCRIPTION

In order to make the objectives, technical solutions and advantages of the present disclosure clearer, the present disclosure is described in detail below in conjunction with specific embodiments and with reference to the accompanying drawings.

It should be noted that the technical or scientific terms used in one or more embodiments of the present disclosure should have the meanings as commonly understood by those of ordinary skill in the art of the present disclosure, unless otherwise defined. The words "first", "second" and similar terms used in one or more embodiments of the present disclosure do not denote any order, quantity, or importance, and are merely used to distinguish between different components. The word "comprise", "include" or similar terms mean that elements or objects appearing before the term cover the listed elements or objects and its equivalents appearing after the term, without excluding other elements or objects. The word "connected to" or "connected with" and similar terms are not limited to physical or mechanical connections, and may include electrical connection, either directly or indirectly. The terms "upper", "lower", "left", "right" and the like are only used to indicate the relative positional relationship, and when the absolute position of a described object changes, the relative positional relationship may also change accordingly.

The EPD table card issuing system used in the related art may increase the cost of users and solution providers. As for the EPD table card issuing system used in the related, at least one dedicated server needs to be deployed, and at the same time a gateway device is connected to the server, such that a user logs into the server from a browser to manage and issue EPD table cards. The server may be deployed privately or in a public cloud. For some customers, especially customers who purchase a small amount of EPD table cards, this solution will increase the cost due to the introduction of the server. Meanwhile, for the solution provider, the deployment of the server increases the implementation cost and the operation and maintenance cost.

Based on the above reasons, the embodiments of the present disclosure provide a method for issuing a decentralized (i.e., a server-removed) EPD table card system. By sinking the computing power to a gateway device or a terminal device such as a PC or a laptop, display content on table cards may be edited by a terminal device on the gateway device or the operating terminal device, and then issued and managed through the gateway device itself. Thus, the complexity of the system is reduced, the customer investment is saved, and the implementation cost and the operation and maintenance cost of a system provider is reduced.

Figure 1:
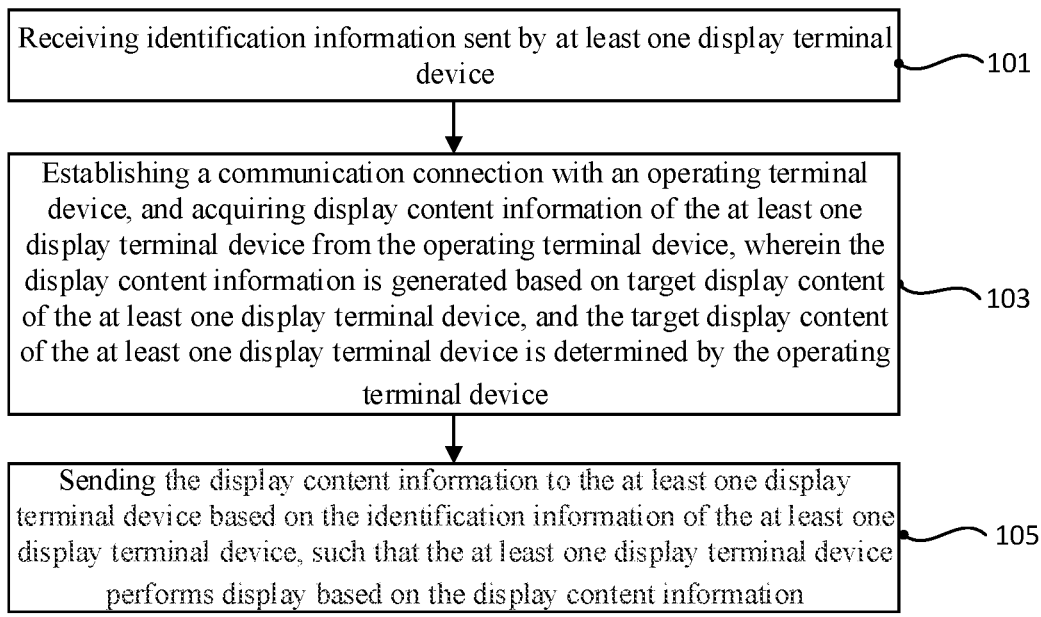
FIG. 1 is a flowchart of a method for transmitting data according to one or more embodiments of the present disclosure.

FIG. 1 is a schematic flowchart of a method for transmitting data according to one or more embodiments of the present disclosure. As shown in FIG. 1, one or more embodiments of the present disclosure provide a method for transmitting data. The method is applicable to a gateway device and includes the following steps.

In S101, the gateway device receives identification information sent by at least one display terminal device.

The display terminal device may be any display terminal connected to a gateway device. The identification information of the display terminal device is configured to uniquely identify the display terminal device. Optionally, the identification information of the display terminal device may be an identifier (ID), an address, a serial number and other information of the display terminal device. The display terminal device may be a display device such as an electronic display table card, an electronic sign, or an electronic tag. Optionally, the electronic display table card may be an EPD table card.

In the embodiments of the present disclosure, after being turned on, the display terminal device may be in a sleep state, and maintains a connection with the gateway device in a heartbeat mode. The display terminal device may enter an awake state from the sleep state at every preset interval time, and send a heartbeat signal carrying the identification information of the display terminal device to the gateway device. Optionally, the interval time may be one minute. After the gateway device is turned on, it receives heartbeat signals from surrounding display terminal devices and acquires identification information of the display terminal devices. Each time the gateway device receives the heartbeat signal carrying the identification information of the display terminal device, the gateway device updates the identification information of the display terminal device stored in the gateway device based on the heartbeat signal.

In S103, the gateway device establishes a communication connection with an operating terminal device, and acquires display content information of the at least one display terminal device from the operating terminal device. The display content information is generated based on target display content of the at least one display terminal device, and the target display content of the at least one display terminal device is determined by the operating terminal device.

In an exemplary embodiment, the display content information is generated based on an operation instruction of the operating terminal device, the operation instruction is generated based on the target display content, determined on an operation interface, of the display terminal device, and the operation interface is generated based on the identification information of the display terminal device.

The operating terminal device may be a terminal device with a data input function, such as a PC, a laptop, a mobile phone, a tablet computer, or other mobile terminal devices.

In the embodiments of the present disclosure, after the gateway device establishes the communication connection with the operating terminal device, the operating terminal device may acquire an operation interface generated based on the identification information of the display terminal device. Information such as to-be-determined target display content and effective time of each display terminal device may be displayed on the operation interface. Optionally, the operation interface may be a web page. Users may operate on the operation interface in the operating terminal device, for example, directly fill on the operation interface or import a template on the operation interface, so as to determine the target display content of each display terminal device. At the same time, the operating terminal device may generate an operation instruction for the determined target display content based on the target display content. The operation instruction may be configured to determine the target display content of the display terminal device. The target display content of the display terminal device may be configured to determine text display information, a display color, a font, a font size, and the like of a target display terminal corresponding to different identification information of the display terminal devices. Finally, the gateway device may acquire the display content information generated based on the operation instruction for the target display content.

In the embodiments of the present disclosure, the display content information is related to the identification information of the display terminal device, and the display content information includes text display information, a display color, a font, a font size, and the like of the display terminal device. The display terminal device may directly display based on the corresponding display content information to achieve a final display effect.

In S105, the gateway device sends the display content information to the at least one display terminal device based on the identification information of the at least one display terminal device, such that the at least one display terminal device performs display based on the display content information.

In an exemplary embodiment, the display content information is sent to at least one display terminal device based on the identification information of the display terminal device.

For example, the display content information is related to the identification information of the display terminal device. The display content information is sent to the display terminal device corresponding to the related identification information of the display terminal device.

In the embodiments of the present disclosure, after the gateway device acquires the display content information, even if the operating terminal device is disconnected from the gateway device, the gateway device still issues the display content information to the corresponding display terminal device based on the identification information of the display terminal device, and the corresponding display terminal device may also directly perform the display based on the display content information.

According to the method for transmitting data in the embodiments of the present disclosure, the determination of the target display content of the display terminal device and the generation of the display content information are implemented on the gateway device or the operating terminal device. That is, the display content of table cards is edited and calculated on the gateway device or the operating terminal device. Therefore, the computing power during table card issue is sunk to the gateway device or the operating terminal device, and then the gateway device can issue and manage the display content of the table cards by itself, without the need to deploy additional servers. Thus, the complexity of the system is reduced, the investment and cost of the user is saved, and the implementation cost and the operation and maintenance cost of the system provider are reduced. The method for transmitting data described in this embodiment is particularly suitable for smaller customers who purchase a small number of EPD table cards.

In some optional embodiments of the present disclosure, the operation interface is configured to display the to-be-determined target display content of the display terminal device. The display terminal device corresponds to the identification information of the display terminal device. The operation interface may be generated by the gateway device or by the operating terminal device.

In the case that the operation interface is generated by the gateway device, the gateway device generates the operation interface based on the identification information of the display terminal device, and sends the operation interface to the operating terminal device, such that the operating terminal device operates on the operation interface to determine the target display content of the display terminal device.

In the embodiments of the present disclosure, the gateway device may generate the operation interface based on the identification information of the display terminal device stored in the gateway device. The to-be-determined target display content of the display terminal device corresponding to the identification information of the display terminal device is displayed on the operation interface. For example, a template may be provided on the operation interface, and a serial number of each display terminal device, and text display information, a display color, a font, a font size, and the like which are to be determined are displayed in the template. In addition, an interface for importing a template may also be provided on the operation interface, and users may determine the target display content by means of template import. Here, the serial number of the display terminal device is in one-to-one correspondence with the identification information of the display terminal device.

Figure 2:
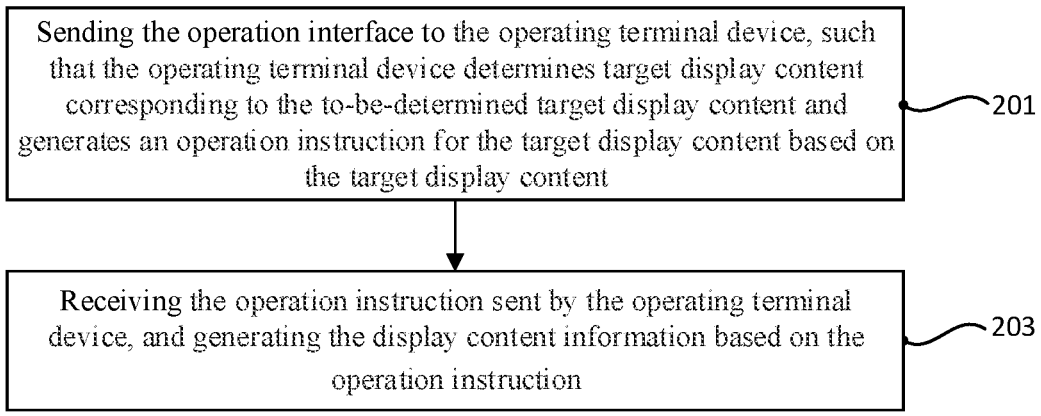
FIG. 2 is a flowchart of a method for transmitting data according to one or more embodiments of the present disclosure.

As shown in FIG. 2, in the case that the operation interface is generated by the gateway device, acquiring the display content information of the at least one display terminal device in step S103 includes the following steps.

In S201, the operation interface is sent to the operating terminal device, such that the operating terminal device determines target display content corresponding to the to-be-determined target display content and generates an operation instruction for the target display content based on the target display content.

In the embodiments of the present disclosure, the gateway device sends the operation interface to the operating terminal device. Users operate on the operation interface in the operating terminal device to determine the target display content, such as a name, a position and other information of a participant to be displayed at the position of the text display information, corresponding to the to-be-determined target display content on the operation interface. At the same time, the operation instruction for the target display content is generated based on the determined target display content and sent to the gateway device. The operation instruction may be configured to determine the target display content of the display terminal device.

In S203, the operation instruction sent by the operating terminal device is received, and the display content information is generated based on the operation instruction.

In the embodiments of the present disclosure, after receiving the operation instruction for the target display content, the gateway device generates display content information based on the received operation instruction for the target display content, and issues the display content information to the display terminal device.

In this embodiment, the gateway device has computing power. The display content information is generated on the gateway device. That is, by sinking the computing power during table card issuance to the gateway device, the complexity of the system is reduced, the investment and cost of the user are saved, and the implementation cost and the operation and maintenance cost of the system provider are reduced.

In the case that the operation interface is generated by the operating terminal device, the gateway device sends the identification information of the display terminal device to the operating terminal device, such that the operating terminal device generates the operation interface based on the identification information of the display terminal device. Then, the operating terminal device operates on the operation interface to determine the target display content of the display terminal device and generate the operation instruction for the target display content. Finally, the operating terminal device generates the display content information based on the operation instruction for the target display content and then sends the display content information to the gateway device.

In the embodiments of the present disclosure, after the gateway device establishes the communication connection with the operating terminal device, an identifier of the display terminal device stored in the gateway device is sent to the operating terminal device. The operation interface is generated through the operating terminal device. The target display content on the operation interface is determined on the operating terminal device, and the operation instruction for the target display content is generated based on the determined target display content. Then, the display content information is generated based on the operation instruction for the target display content and then sent to the gateway device.

The gateway device receives the display content information sent by the operating terminal device, and issues the display content information to the display terminal device, such that the display terminal device completes display.

In this embodiment, the display content information is generated on the operating terminal device. That is, by sinking the computing power during table card issuance to the operating terminal device, the complexity of the system is reduced, the investment and cost of the user are saved, and the implementation cost and the operation and maintenance cost of the system provider are reduced.

Optionally, establishing the communication connection with the operating terminal device in step S103 includes: acquiring gateway device information and issuing the gateway device information to a local area network, such that the operating terminal device connected to the local area network acquires the gateway device information and establishes the communication connection with the gateway device based on the gateway device information.

The gateway device information includes an IP address of the gateway device, a network service port and a version number. The network service port may be a hypertext transfer protocol (HTTP) service port, a transmission control protocol (TCP) service port, a user datagram protocol (UDP) service port, a message queuing telemetry transport (MQTT) service port, and the like.

In an exemplary embodiment, the gateway device information is as follows:
Gateway IP|Port number|Version number
192.168.0.3|8000|V1

After the gateway device is turned on, the network service port will be opened to wait for being called to create an EPD table card task. Then, the gateway device will acquire and broadcast the IP address, the network service port and the version number to the local area network based on a multicast domain name system (mDNS) protocol, an IP broadcast protocol, and a simple service discovery protocol (SSDP), a Bonjour protocol (implemented based on mDNS protocol and DNS-SD (DNS Service Discovery) protocol), or the like. After the operating terminal device is turned on, it automatically scans the local area network and finds the gateway device information in the local area network, and finds the gateway device, thereby establishing the communication connection with the gateway device. Therefore, a service can be called, without configuring the IP address, such that the gateway device may provide the identifier of the display terminal device to the operating terminal device, or provide the operation interface generated based on the identifier of the display terminal device to the operating terminal device. At the same time, the operating terminal device sends the display content information generated on the operating terminal device to the gateway device, or sends the operation instruction for the target display content generated on the operating terminal device to the gateway device.

The specific embodiments of the present disclosure have been described above. Other embodiments fall within the scope of the appended claims. In some cases, the actions or steps in the claims may be performed in a different order than that in the embodiments and desired results can still be achieved. In addition, the processes described in the drawings can achieve the desired results without necessarily being executed in the shown specific order or sequential order. In some embodiments, multitasking and parallel processing are also possible or may be advantageous.

Based on the same inventive concept, corresponding to the method according to any of the above embodiments, one or more embodiments of the present disclosure further provide a gateway device. The gateway device includes a memory, a processor, and a computer program that is stored in the memory and operable on the processor. The processor, when executing the program, is caused to implement the method for transmitting data according to any one of the above embodiments.

Figure 3:
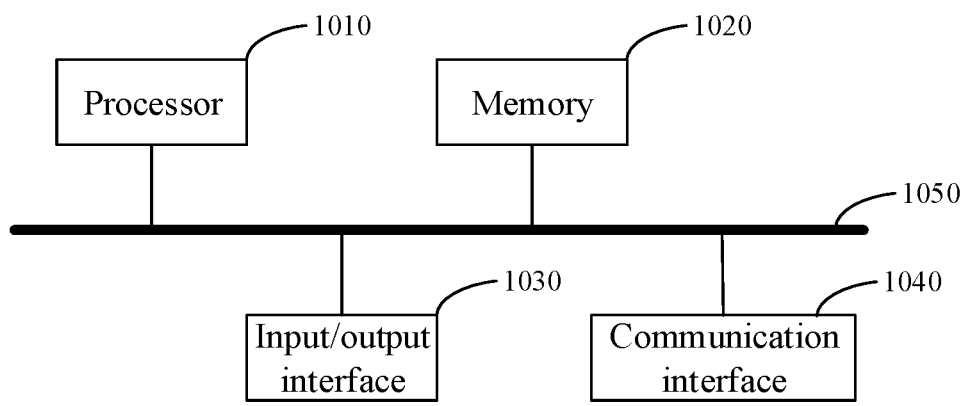
FIG. 3 is a schematic structural diagram of a gateway device according to one or more embodiments of the present disclosure.

FIG. 3 shows a schematic structural diagram of a hardware structure of a gateway device provided according to this embodiment. The gateway device may include a processor 1010, a memory 1020, an input/output interface 1030, a communication interface 1040, and a bus 1050. The processor 1010, the memory 1020, the input/output interface 1030, and the communication interface 1040 implement the communication connection between each other in the device through the bus 1050.

The processor 1010 may be implemented by a general central processing unit (CPU), a microprocessor, an application specific integrated circuit (ASIC), one or more integrated circuits, or the like, to execute related programs, so as to implement the technical solutions provided by the embodiments of the present disclosure.

The memory 1020 may be implemented in the form of a read only memory (ROM), a random access memory (RAM), a static storage device, a dynamic storage device, or the like. The memory 1020 may store an operating system and other application programs. When the technical solutions provided by the embodiments of the present disclosure are implemented through software or firmware, related program codes are stored in the memory 1020 and called and executed by the processor 1010.

The input/output interface 1030 is configured to be connected to an input/output module, to implement information input and output. The input/output module may be configured in a device (not shown in the drawings) as a component, or may be externally connected to the device to provide corresponding functions. The input module may include a keyboard, a mouse, a touch screen, a microphone, various sensors, and the like, and the output module may include a display, a speaker, a vibrator, an indicator light, and the like.

The communication interface 1040 is configured to be connected to a communication module (not shown in the drawings), to implement the communication interaction between the device and other devices. The communication module can implement communication in a wired mode (e.g., via a USB or a network cable), or in a wireless mode (e.g., via a mobile network, WIFI, or Bluetooth).

The bus 1050 includes a channel configured to transmit information among various components (for example, the processor 1010, the memory 1020, the input/output interface 1030, and the communication interface 1040) of the device.

It should be noted that although only the processor 1010, the memory 1020, the input/output interface 1030, the communication interface 1040, and the bus 1050 are showed in the above device, the device may also include other components necessary for normal operation in the specific implementation process. In addition, persons skilled in the art can understand that the above-mentioned device may also include only the components necessary to implement the solutions of the embodiments of the present disclosure, without not necessarily including all the components shown in the drawings.

The gateway device in the above embodiment is configured to implement the corresponding method for transmitting data in any of the foregoing embodiments, and has the beneficial effects of the corresponding method embodiments, which will not be repeated here.

Figure 4:
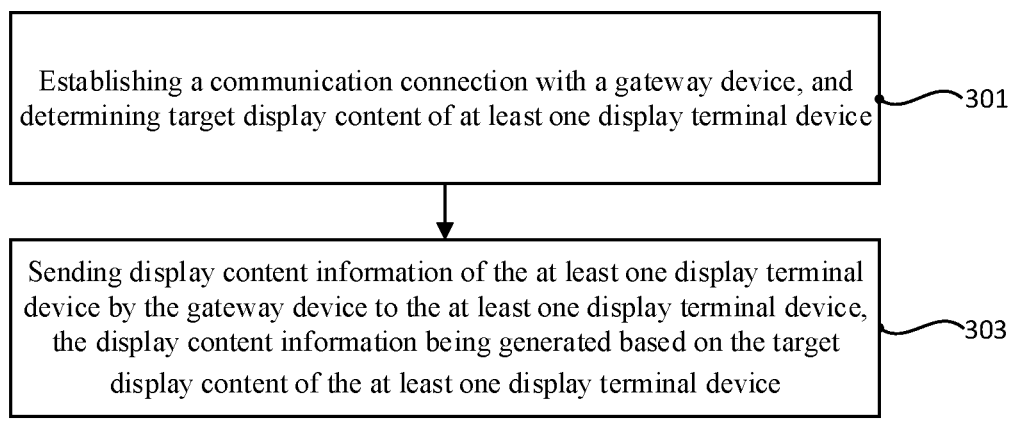
FIG. 4 is a flowchart of a method for transmitting data according to one or more embodiments of the present disclosure.

Based on the same inventive concept, one or more embodiments of the present disclosure further provide another method for transmitting data. As shown in FIG. 4, the method for transmitting data is applicable to an operating terminal device and includes the following steps.

In S301, the operating terminal device establishes a communication connection with a gateway device, and determines target display content of at least one display terminal device.

Optionally, an operation instruction for the target display content of the display terminal device is determined on an operation interface. The operation interface is generated based on identification information of the display terminal device.

In the embodiments of the present disclosure, after the operating terminal device establishes the communication connection with the gateway device, the operating terminal device may acquire an operation interface generated based on the identification information of the display terminal device. Target display content to be determined by each operating terminal device may be displayed on the operation interface. The identification information of the display terminal device is configured to uniquely identify the display terminal device. After the display terminal device is turned on, it sends the identification information of the display terminal device to the gateway device. The gateway device receives the identification information of the display terminal device sent by each display terminal device, and stores the identification information of each display terminal device.

After the operating terminal device acquires the operation interface, users may operate on the operation interface in the operating terminal device, to determine the target display content of each display terminal device. At the same time, an operation instruction for the target display content is generated by the operating terminal device. The operation instruction may be configured to determine the target display content of the display terminal device. The target display content of the display terminal device may be configured to determine text display information, a display color, a font, a font size, and other display content of the operating terminal device corresponding to identifiers of different display terminal devices.

In S303, display content information of the at least one display terminal device is sent by the gateway device to the at least one display terminal device. The display content information is generated based on the target display content of the at least one display terminal device.

In an exemplary embodiment, the display content information generated based on the operation instruction is sent by the gateway device to the at least one display terminal device, such that the display terminal device performs display based on the display content information.

In the embodiments of the present disclosure, the display content information may be generated based on the operation instruction for the target display content, and then the display content information is sent to the corresponding display terminal device by the gateway device. After the gateway device acquires the display content information, even if the operating terminal device is disconnected from the gateway device, the gateway device still issues the display content information to the corresponding display terminal device based on the identification information of the display terminal device, and the corresponding display terminal device can also directly perform the display based on the display content information.

According to the method for transmitting data in the embodiments of the present disclosure, the display content information of the operating terminal device is generated on the gateway device or the operating terminal device. That is, the display content of table cards is edited and calculated on the gateway device or the operating terminal device. Therefore, the computing power for managing, editing and issuing the table cards is sunk to the gateway device or the operating terminal device, without the need to deploy additional servers, thereby reducing the complexity of the system, saving the investment and cost of users, and reducing the implementation cost and the operation and maintenance cost of the system provider.

In some optional embodiments of the present disclosure, the operation interface is configured to display the to-be-determined target display content of the display terminal device corresponding to the identification information of the display terminal device. The operating terminal device determines the target display content from the to-be-determined target display content on the operation interface, and generates the operation instruction for the determined target display content based on the target display content. The operation interface may be generated by the gateway device or the operating terminal device.

In the case that the operation interface is generated by the gateway device, the operating terminal device receives the operation interface sent by the gateway device, and the operating terminal device can operate on the operation interface to determine the target display content of the display terminal device. The operation interface is generated by the gateway device based on the identification information of the display terminal device.

In the embodiments of the present disclosure, the operation interface is generated by the gateway device based on the identification information of the display terminal device stored in the gateway device, and then the operation interface is provided to the operating terminal device. The to-be-determined target display content of the display terminal device corresponding to the identification information of the display terminal device is displayed on the operation interface. For example, a template may be provided on the operation interface, and the serial number, text display information, display color, font, font size, and the like to be determined of each display terminal device are displayed in the template. The serial number of the display terminal device is in one-to-one correspondence to the identifier of the display terminal device. In the embodiments of the present disclosure, after the gateway device provides the operation interface to the operating terminal device, users may operate on the operation interface in the operating terminal device to determine the target display content corresponding to the to-be-determined target display content on the operation interface. For example, the name, position and other information of a participant should be displayed at the position of the text display information. At the same time, the operating terminal device may generate the operation instruction for the target display content based on the determined target display content. The operation instruction for the target display content may be configured to determine the target display content of the display terminal device.

In the embodiments of the present disclosure, after determining the operation instruction for the target display content of the display terminal device on the operation interface, the operating terminal device sends the operation instruction for the target display content to the gateway device. The gateway device may then generate display content information based on the received operation instruction for the target display content, and then issue the display content information to the display terminal device.

In the method for transmitting data provided in this embodiment, the computing power of the gateway device is made full use of, and the display content information is generated on the gateway device. That is, by sinking the computing power during table card issuance to the gateway device, the complexity of the system is reduced, the investment and cost of the users are saved, and the implementation cost and the operation and maintenance cost of the system provider are reduced.

Optionally, in the case that the operation interface is generated by the operating terminal device, the operating terminal device receives the identification information of the display terminal device sent by the gateway device, and generates the operation interface based on the identification information of the display terminal device. Then, the operation interface can operate on the operation interface to determine the target display content of the display terminal device.

In the embodiments of the present disclosure, after generating the operation instruction for the target display content based on the determined target display content, the operating terminal device generates display content information based on the operation instruction for the target display content, and then issues the display content information to the gateway device. The gateway device receives the display content information, and then issues the display content information to the display terminal device, such that the display terminal device completes display.

In this embodiment, by sinking the computing power during table card issuance to the operating terminal device, the display content information is generated on the operating terminal device, thereby reducing the complexity of the system, saving the investment and cost of users, and reducing the implementation cost and the operation and maintenance cost of the system provider. Optionally, establishing the communication connection with the gateway device in step S301 includes: acquiring gateway device information in a local area network, and establishing the communication connection with the gateway device based on the gateway device information. The gateway device information includes an IP address of the gateway device, a network service port and a version number. The network service port may be a HTTP service port, a TCP service port, a UDP service port, a MQTT service port, or the like.

Optionally, in any of the above embodiments, the gateway device may be equipped with a Linux system, such that gateway service software may be installed in the gateway device, so as to implement the communication connection with the display terminal device and the operating terminal device and the processing of various data in the process of issuing table card data.

Optionally, a radio frequency module is also installed in the gateway device, to implement the communication between the gateway device and an EPD table card. The communication protocols used include but are not limited to LoRa, Bluetooth, ZigBee and 433M. The gateway device issues the display content information to the EPD table card through these IoT protocols.

Optionally, in the case that the gateway device has computing power, content management and issuing service software may be installed in the gateway device. The operation interface is generated by the content management and issuing service software in the gateway device and provided to the operating terminal device for users to operate, to generate the display content information of the display terminal device. In this case, users need to enter a gateway IP: port number in a browser on the operating terminal device to access a Web interface to be operated.

Optionally, the content management and issuing service software may also be installed in the operating terminal device. The operation interface is generated by the content management and issuing service software in the operating terminal device, and provided to the operating terminal device for users to operate, so as to generate the display content information of the display terminal device. In this case, users need to enter localhost: port number in the browser on the operating terminal device to access a Web interface to be operated.

The specific embodiments of the present disclosure have been described above. Other embodiments fall within the scope of the appended claims. In some cases, the actions or steps described in the claims may be performed in a different order than that in the embodiments and can still achieve desired results. In addition, the processes described in the drawings can achieve the desired results without necessarily being executed in the shown specific order or sequential order. In some embodiments, multitasking and parallel processing are also possible or may be advantageous.

Based on the same inventive concept, corresponding to the method according to any of the above embodiments, one or more embodiments of the present disclosure further provide an operating terminal device. The operating terminal device includes a memory, a processor, and a computer program that is stored in the memory and operable on the processor. The processor, when executing the program, is caused to implement the method for transmitting data according to any one of the above embodiments.

Figure 5:
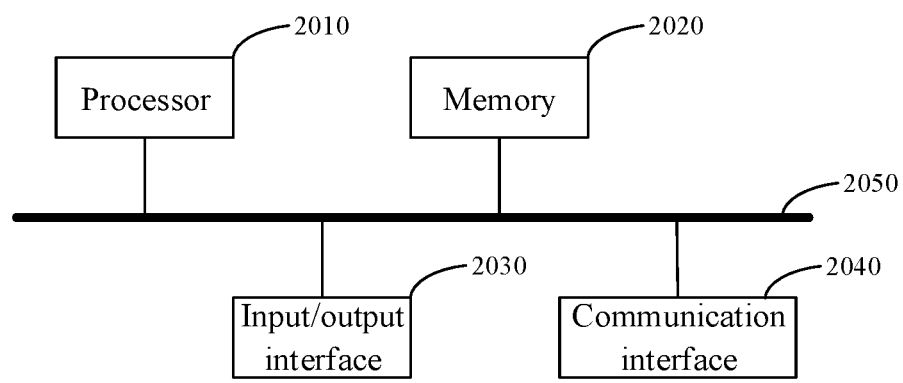
FIG. 5 is a structural diagram of an operating terminal device according to one or more embodiments of the present disclosure.

FIG. 5 shows a schematic diagram of a hardware structure of an operating terminal device provided by this embodiment. The device may include a processor 2010, a memory 2020, an input/output interface 2030, a communication interface 2040, and a bus 2050. The processor 2010, the memory 2020, the input/output interface 2030, and the communication interface 2040 implement the communication connection between each other in the device through the bus 2050.

The processor 2010 may be implemented by a general central processing unit (CPU), a microprocessor, an application specific integrated circuit (ASIC), one or more integrated circuits, or the like, for executing related programs in order to implement the technical solutions provided by the embodiments of the present disclosure.

The memory 2020 may be implemented in the form of a read only memory (ROM), a random access memory (RAM), a static storage device, a dynamic storage device, or the like. The memory 2020 may store an operating system and other application programs. When the technical solutions provided by the embodiments of the present disclosure are implemented through software or firmware, related program codes are stored in the memory 2020 and called and executed by the processor 2010.

The input/output interface 2030 is configured to be connected to an input/output module to implement information input and output. The input/output module may be configured in the operating terminal device (not shown in the drawings) as a component, or may be externally connected to the device to provide corresponding functions. The input module may include a keyboard, a mouse, a touch screen, a microphone, various sensors, and the like, and the output module may include a display, a speaker, a vibrator, an indicator light, and the like.

The communication interface 2040 is configured to be connected to a communication module (not shown in the drawings) to implement the communication interaction between the device and other devices. The communication module can implement communication in a wired mode (e.g., via a USB, or a network cable), or in a wireless mode (e.g., via a mobile network, WIFI, or Bluetooth).

The bus 2050 includes a channel configured to transmit information among various components (for example, the processor 2010, the memory 2020, the input/output interface 2030, and the communication interface 2040) of the device.

It should be noted that although only the processor 2010, the memory 2020, the input/output interface 2030, the communication interface 2040, and the bus 2050 are showed in the above device, the device may also include other components necessary for normal operation in the specific implementation process. In addition, persons skilled in the art can understand that the above-mentioned device may also include only the components necessary to implement the solutions of the embodiments of the present disclosure, without necessarily including all the components shown in the drawings.

The operating terminal device in the above embodiment is configured to implement the corresponding method for transmitting data in any of the foregoing embodiments, and has the beneficial effects of the corresponding method embodiments, which will not be repeated herein.

Based on the same inventive concept, corresponding to the method according to any of the above embodiments, the present disclosure further provides a non-transitory computer-readable storage medium storing computer instructions therein. The computer instructions, when executed by a computer, cause the computer to implement the method for transmitting data according to any of the above embodiments.

The computer-readable medium in this embodiment includes persistent and non-persistent and removable and non-removable media that may be implemented in any method or technology for storage of information. The information may be computer-readable instructions, data structures, program modules or other data. Examples of the computer storage medium include, but are not limited to, a phase-change RAM (PRAM), a static random access memory (SRAM), a dynamic random access memory (DRAM), other types of random access memories (RAM), a read only memory (ROM), an electrically erasable programmable read only memory (EEPROM), a flash memory or other memory technologies, a compact disk read only memory (CD-ROM), a digital versatile disk (DVD) or other optical storages, magnetic cassettes, magnetic tapes, magnetic disk storages or other magnetic storage devices, or any other non-transmission mediums that can be used to store information for access by a computing device.

The computer instructions stored in the storage medium according to the above embodiment is configured to cause the computer to implement the method for transmitting data in any of the foregoing embodiments, and has the beneficial effects of the corresponding method embodiment, which will not be repeated herein.

Figure 6:
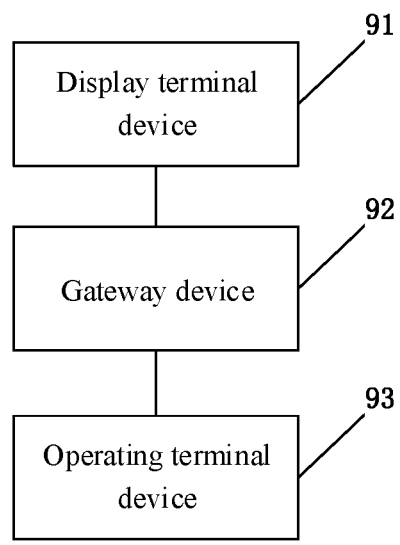
FIG. 6 is a structural diagram of a system for transmitting data according to one or more embodiments of the present disclosure.

Based on the same inventive concept, one or more embodiments of the present disclosure provide a system for transmitting data. As shown in FIG. 6, the system for transmitting data includes a display terminal device 91, the gateway device 92 according to any one of the above embodiments, and the operating terminal device 93 according to any one of the above embodiments.

The system in the above embodiment includes the gateway device and the operating terminal device as described in the foregoing embodiments, and is configured to implement the corresponding methods for transmitting data in the foregoing embodiments. The system in the above embodiment has the beneficial effects of the corresponding method embodiment, which will not be repeated herein.

It should be understood by persons of ordinary skill in the art that any of the embodiments discussed above is only exemplary and is not intended to imply that the scope of the present disclosure (including the claims) is limited to the examples. Under the concept of the present disclosure, the above embodiments or technical features of different embodiments may be combined, the steps may be performed in any order, and there are many other changes in different aspects to the above-described one or more embodiments of the present disclosure. For simplicity, these changes are not described in detail herein.

In addition, in order to simplify explanation and discussion as well as not to make one or more embodiments of the present disclosure difficult to understand, the connection between the integrated circuit (IC) chip and the well-known power/ground of other components may be shown or may not be shown in the drawings. Moreover, the devices may be illustrated in block diagrams, to avoid making one or more embodiments of the present disclosure difficult to understand and in consideration of the fact that the details of the implementations of these devices shown in the block diagrams are highly dependent on the platform for implementing one or more embodiments of the present disclosure (that is, these details should be totally in the scope understood by persons skilled in the art). Under the circumstance that the specific details (e.g., circuits) are elaborated to describe the exemplary embodiments of the present disclosure, it is apparent to those skilled in the art that one or more embodiments of the present disclosure may be implemented without these specific details or where the specific details have changed. Therefore, the descriptions should be considered as illustrative but not restrictive.

Although the present disclosure is described in combination with the specific embodiments, based on the forgoing descriptions, many substitutions, modifications and variations of the embodiments are obvious to persons of ordinary skill in the art. For example, other memory architectures (e.g., a dynamic RAM (DRAM)) may be used in the discussed embodiments.

One or more embodiments of the present disclosure are intended to cover all such substitutions, modifications and variations that fall within the broad range of the appended claims. Thus, any omissions, modifications, equivalent substitutions, improvements and so on made within the spirit and principle of one or more embodiments of the present disclosure shall be included in the protection scope of the present disclosure.

What is claimed is:

1. A method for transmitting data, applicable to a gateway device, the method comprising:

receiving identification information sent by at least one electrophoretic display (EPD) table card;

establishing a communication connection with an operating terminal device, and sending the identification information sent by the at least one EPD table card to the operating terminal device, wherein the operating terminal device is installed with content management and issuing service software;

acquiring display content information of the at least one EPD table card from the operating terminal device, wherein the display content information is generated based on an operation instruction of the operating terminal device, the operation instruction being generated based on target display content of the at least one EPD table card determined on an operation interface, the operation interface being generated by the content management and issuing service software based on the identification information of the at least one EPD table card and provided to the operating terminal device for users to operate to display to-be-determined target display content of the at least one EPD table card corresponding to the identification information; and sending the display content information to the at least one EPD table card based on the identification information of the at least one EPD table card, such that the at least one EPD table card performs display based on the display content information;

wherein a template is provided on the operation interface and is configured to determine the target display content, and a serial number of each EPD table card and text display information, a display color, a font, and a font size which are to be determined are displayed in the template, the serial number of the EPD table card being in one-to-one correspondence with the identification information of the EPD table card.

2. The method according to claim 1, wherein the display content information is related to the identification information of the EPD table card, and sending the display content information to the at least one EPD table card based on the identification information of the at least one EPD table card comprises:

sending the display content information to the EPD table card corresponding to the related identification information of the EPD table card.

3. The method according to claim 1, wherein establishing the communication connection with the operating terminal device comprises:

acquiring gateway device information and issuing the gateway device information to a local area network, such that the operating terminal device connected to the local area network acquires the gateway device information and establishes the communication connection with the gateway device based on the gateway device information.

4. The method according to claim 3, wherein the gateway device information comprises an IP address of the gateway device, a network service port and a version number.

5. A method for transmitting data, applicable to an operating terminal device installed with content management and issuing service software, the method comprising:

establishing a communication connection with a gateway device, and receiving identification information of at least one electrophoretic display (EPD) table card sent by the gateway device;

generating an operation interface by the content management and issuing service software based on the identification information of the at least one EPD table card, wherein the operation interface is provided to the operating terminal device for users to operate to display to-be-determined target display content of the at least one EPD table card corresponding to the identification information;

determining, from the to-be-determined target display content, target display content of the at least one EPD table card through the operation interface, and generating an operation instruction based on the target display content of the at least one EPD table card determined on the operation interface;

generating display content information of the at least one EPD table card based on the operation instruction, wherein a template is provided on the operation interface and is configured to determine the target display content, and a serial number of each EPD table card and text display information, a display color, a font, and a font size which are to be determined are displayed in the template, the serial number of the EPD table card being in one-to-one correspondence with the identification information of the EPD table card; and sending the display content information of the at least one EPD table card by the gateway device to the at least one EPD table card.

6. The method according to claim 5, wherein establishing the communication connection with the gateway device comprises:

acquiring gateway device information in a local area network, and establishing the communication connection with the gateway device based on the gateway device information.

7. The method according to claim 6, wherein the gateway device information comprises an IP address of the gateway device, a network service port and a version number.

8. A gateway device, comprising a memory, a processor, and a computer program that is stored in the memory and operable on the processor, wherein the processor, when executing the computer program, is caused to implement the method for transmitting data according to claim 1.

9. An operating terminal device, comprising a memory, a processor, and a computer program that is stored in the memory and operable on the processor, wherein the processor, when executing the program, is caused to implement the method for transmitting data according to claim 5.

10. A system for transmitting data, comprising an electrophoretic display (EPD) table card, a gateway device and an operating terminal device installed with content management and issuing service software:

the gateway device is configured to: receive identification information sent by at least one EPD table card; establish a communication connection with an operating terminal device; send the identification information sent by the at least one EPD table card to the operating terminal device; acquire display content information of the at least one EPD table card from the operating terminal device, wherein the display content information is generated based on an operation instruction of the operating terminal device, the operation instruction being generated based on target display content of the at least one EPD table card determined on an operation interface, the operation interface being generated by the content management and issuing service software based on the identification information of the at least one EPD table card and provided to the operating terminal device for users to operate to display to-be-determined target display content of the at least one EPD table card corresponding to the identification information; and send the display content information to the at least one EPD table card based on the identification information of the at least one EPD table card, such that the at least one EPD table card performs display based on the display content information; and the operating terminal device is configured to: establish the communication connection with the gateway device; receive the identification information of at least one EPD table card sent by the gateway device; generate the operation interface by the content management and issuing service software based on the identification information of the at least one EPD table card; determine, from the to-be-determined target display content, the target display content of the at least one EPD table card through the operation interface; generate the operation instruction based on the target display content of the at least one EPD table card determined on the operation interface; generate the display content information of the at least one EPD table card based on the operation instruction; and send the display content information of the at least one EPD table card by the gateway device to the at least one EPD table card;

wherein a template is provided on the operation interface and is configured to determine the target display content, and a serial number of each EPD table card and text display information, a display color, a font, and a font size which are to be determined are displayed in the template, the serial number of the EPD table card being in one-to-one correspondence with the identification information of the EPD table card.

* * * * *